Patented Oct. 18, 1938

2,133,622

UNITED STATES PATENT OFFICE 2,133,622

CEMENT PROCESS AND PRODUCT

Harry M. Larmour and Stephen C. Pierce, Jr., Merced, Calif., assignors to Yosemite Portland Cement Corporation, Merced, Calif., a corporation of Delaware No Drawing. Application June 12, 1934, Serial No. 730,262

16 Claims. (Cl. 106—25)

This invention relates to the manufacture of cement, particularly modified Portland cements as used for various purposes, and the objects of the invention are to provide a process whereby modified Portland cements may be easily and cheaply made, also such a process which will provide for the production of a plurality of cement modifications, all starting from a Portland or similar cement clinker produced in the ordinary way. Other advantages of the process will appear in the following description.

The usual manufacture of Portland cement comprises selection of proper raw materials such as limestone, argillaceous and silicious materials, grinding to suitable fineness for intimate mixture, proportioning to a predicated composition, calcining in a rotary kiln at a temperature of incipient fusion to an end point of a minimum free lime and insoluble residue, cooling and grinding the resulting clinker to cement, usually after the addition of a small proportion of gypsum to control set. Modern cement plants are designed for this one purpose and usually with a fixed composition and production standard in mind. Changes in this production set-up under usual conditions are both expensive and impractical. However, it is very desirable for special conditions to change the properties of the cement manufactured. Such changes may be made by shifting the raw composition of the cement or by making changes in the process of manufacture which effect the actual compound composition of the product.

United States Patent Nos. 1,700,032 and 1,700,033, issued in 1929 to H. R. Durbin; U. S. Patent Nos. 1,791,800 and 1,893,696, issued to J. A. Colton in 1931 and 1933, respectively; U. S. Patent No. 1,784,840, issued to Guy S. La Forge in 1930; U. S. Patent No. 1,856,442 issued to H. H. Steinour in 1932; U. S. Patent No. 1,785,508 issued in 1930 to Elias R. Wilner, and reissued as No. 19,005 in 1933; and U. S. patent issued to E. W. Rice in 1933, are evidence of the desire to change the properties of cement, as compared to the true Portland cement.

Durbin, Colton, La Forge and Steinour are all modifications of a reburning process. Durbin in one case is apparently attempting to complete the reactions of his first burn by a second grind followed by a second burn; in his second case, he changes his composition by increasing the lime content of his finished product. In both cases, however, after burning and cooling the clinker, he grinds it to a suitable fineness and then reburns either with or without additional lime to get the lime silicate compounds he desires. Additional cost is added in both capital investment of grinding machinery, and operation of the grinding machinery, and for the same factory production rate additional burning machinery and operating labor is required.

The same comments will apply to patents of Colton, except that Colton adds some of the ground clinker to his new raw material as a catalyst, which supposedly accelerates the reaction in the kiln. In his one case he uses some 25% of ground clinker with the raw material, which cuts the production capacity of his plant 25%, and in the other he reburns the entire amount, which demands half capacity.

La Forge has a similar patent to Colton, intergrinding only a portion of his clinker with the raw material. His production capacity, therefore, is materially lower.

Steinour first burns a high lime mix in his kiln, which he describes as so high that it is impossible to get a proper combination between the acids and the bases even with several successive burns. He then grinds his clinker, adding a suitable proportion of clay, and recalcines to the desired end point. This, of course, also materially reduces the plant productive capacity.

Wilner and Rice are in rather a different class as they both produce a more or less hydraulic material which is interground into regular Portland cement clinker after it is burned and cooled. The cements they are manufacturing are essentially for sea and alkali water resistance, together with some additional plasticity.

A third type of modified cement which has not been seriously covered with patents is being used on the Boulder Dam. It is a low lime low temperature cement with a minimum amount of tricalcium aluminate. This material calls for serious modification of the original compounds, and rather serious changes in manufacturing operation, adding to the cost of production, and also reduces the productive capacity of the plant.

The above discussion indicates that normal cement compositions do not fit all purposes of cement. To meet all the demands would probably require about six different types of cement. There is thus a demand for high early strength cement, plastic cements, oil well cements, normal Portland cement, sea resistant cements, and low temperature cements. The process of the present application which we have developed is suitable for the manufacture of any of these types of cement, in that it permits a composition change either from a standpoint of oxide composition or actual compound composition without seriously disturbing the ordinary Portland cement manufacturing process.

According to the Cement Association Fellowship Research at the U. S. Bureau of Standards, in the normal production of Portland cement, the chief ingredients are calcium silicates, either the tricalcium silicates, or beta dicalcium silicates. These two compounds usually comprise 75% to 80% of the total. The next compound of importance is tricalcium aluminate, and finally we have the compound tetra calcium alumino ferrate. This latter compound is made by replacing some of the alumina with iron oxide. Properties of these various compounds have been reasonably well established, and considerable desirable variations in the properties of cement can be made with an adjustment of the proportions of these potential compounds, if manufacturing conditions remain constant. We have discovered that greater changes can be made by changing manufacturing conditions and keeping the raw compounds introduced to the clinkering kiln constant than by changing composition and holding the process constant.

The first six patents listed are essentially confined to shifting the ratio of dicalcium silicate to tricalcium silicate.

In the manufacture of low temperature cement in the Boulder Dam construction, alumina is replaced by iron oxide, and the dicalcium silicate is present considerably in excess of tricalcium silicate.

In the case of the Wilner and Rice patents, they have gone in a different direction, maintaining the original structure of the Portland cement clinker, and adding a material which is composed of less basic calcium silicates with perhaps some other compounds.

We have found that after a normal Portland cement clinker has been produced, finely divided extraneous ingredients of almost any nature can be added to the hot clinker to change its chemical composition, as where necessary the hot unground clinker may also be reheated with these extraneous compounds and maintained at an advanced heat until the desired resulting compounds are formed. In this manner cements of almost any desired properties can be produced without materially disturbing a predicated process of a mill in question. We would not limit ourselves as to the nature of the compound which we would add to the hot clinker, but would rather select a suitable compound to give a desired clinker composition. The heat treatment which would be given to the mixture of clinker and the added compounds would also be determined by the results desired. For examples of the functioning of the process, let us assume a cement clinker of approximately the following composition is used as the basis of our process (though a clinker of any other composition may be used as a basis):

| | Per cent |
|---|---|
| Tricalcium silicate | 50 |
| Dicalcium silicate | 30 |
| Tricalcium aluminate | 8 |
| Tetracalcium alumino ferrate | 8 |
| Magnesia | 1½ |

If a maximum of tricalcium silicate should be desired in this to produce a high strength cement, we would simply add a theoretical amount of lime in the form of quicklime, calcium hydrate, or carbonate of lime to the red hot unground clinker as it is discharged from the rotary kiln into a heat treating container, such as a rotary cylinder, and then apply heat to or in the container and increase the temperature substantially back to the clinker temperature of the kiln while maintaining the mixture as it passes through this container under substantially reducing conditions by exclusion of air and admission of reducing gases, or otherwise, and tumbling the material about for a time period from about fifteen minutes to one hour. We have found that sufficient reaction between the lime and clinker takes place at these temperatures and under these conditions to reduce the free lime to a minimum, for that material will calculate to the desired potential compounds, and have the desired properties when ground to cement.

If a low temperature cement is desired, of the type specified for Boulder Dam now building, we take the above red hot normal clinker, add a finely divided material containing a suitable amount of iron oxide and silica with a minimum amount of alumina, say so that the ratio of iron oxide to alumina approaches 1 to .64 in the finished product. The silica addition will depend on the specification for dicalcium silicate. Then we maintain suitable temperature conditions by application of heat and for a time period to complete the reaction, and it will be found that sufficient reaction has taken place between the additive and the clinker to chemically combine these materials, giving the resulting compound composition and performance desired.

If a cement with an active though not fully combined silica is desired, then the extraneous ground material in any desired quantity is added to the red hot clinker discharged from the kiln, and a heat treatment practiced at a lower temperature, the required temperature in this case generally being between 750° C. and 1050° C. maintained for a time period from a quarter hour to a half hour, depending on the nature of the silicious material. In this way we will not necessarily disturb the composition in the original clinker, but will give the resultant product a composition consisting of normal or slightly modified clinker and activated silicious materials which will have hydraulic properties as the hydration of the cement continues.

We are aware that it has been vaguely suggested in the art to add pozzuolanic material to hot clinker, but we have been unable to find any reaction which takes place at a sufficiently low temperature to accomplish anything of value with only the residual heat of the clinker that is discharged openly from the rotary kiln as the falling off in temperature is considerable, but we have found that in every case it has been necessary to maintain the heat or add some additional heat to maintain it or elevate and maintain it, all while tumbling the clinker and the added material about for a length of time until the desired reaction is effected, and this is the essence of the present invention, something which we believe has entirely escaped the earlier investigators.

Additions for the manufacture of a so-called high silicate or pozzuolanic cement require heat treatment at temperature ranging above 700° C. Normal rotary kiln operation discharges clinker at about 1200° C. or lower, an addition of 30% of normally cool pozzuolanic or other silicious material such as shale, pumicite, kieselguhr, etc., will reduce the temperature to 840° C. and much lower if moisture is present. Normal radiation while transferring material from rotary kiln to a suitable container will materially reduce that temperature; so it is found that even for a temperature of 700° C. or 800° C. it is essential that we have some increase in temperature and particularly so if the high temperature is to be maintained for a length of time running from a half hour to a couple of hours as is often necessary to secure the results desired. It may even be desirable to increase the temperature sufficiently to make for some surface reactions with the normal clinker.

In some particular cases we have practiced, it has been found possible to take a siliceous material containing a small amount of alumina, iron and alkali fluxing materials, introduce it in a powdered or finely divided condition to the red hot clinker from the kiln and rotate it in the heat treating cylinder heated internally to about the fusing temperature of the additive which will be below that of the clinker and thereby coat each individual clinker with an adherent covering resembling common brick or tile in nature. Such a clinker product then gives the properties of a normal clinker on the inside, and a more or less vitrified waterproof coating on the outside. The vitrified water-proof coating, upon fine grinding becomes a pozzuolanic material capable of combining with the lime which is freed during the hydration reaction, making for hydraulic compounds which give increased strength to the concrete at later periods. Further, an increase in grindability is noted when the process is practiced, and the coating seems to protect the clinker within and prevent its becoming more difficult to grind with time as is the case with ordinary clinker.

A silicious material or mixture suitable for the coating of the clinker would be a finely ground mixture or natural deposit containing about the following elements and proportions:

$SiO_2$ _____ 50% plus
$Fe_2O_3$ ___ 0 to 10%
$Al_2O_3$ ___ 0 to 40% together with the associated impurities which should be included, 1 to 6% alkali.

In use about 10 to 20 pounds of the above per hd. wt. of clinker is continuously introduced to the discharging red hot clinker and rotated in the drum for about one-quarter to one hour's time at a temperature maintained at about 1000° C. to 1200° C., and then cooled or permitted to cool spontaneously.

The Portland Cement Association Committee of Conservation has produced several studies, showing that clinker becomes resistant to grindability after it increases in age. The resistance to grindability is undoubtedly due to chemical reactions that take place at a slow rate as the clinker remains in storage. Sealing the clinker in the vitrified coating very materially reduces the resistance to grindability.

Another important feature of the coating, whether a complete or but a partial seal, is that for a given percentage of additive it insures the same ratio of pozzuolana throughout the mass as there is no segregation in subsequent handling or storage of the clinker.

Summarizing the invention, the process is essentially one which permits modification of properties and compound composition of Portland cement clinker without materially upsetting the normal manufacturing processes of a producing cement plant, and for the most part increases the possible production to the extent of the added materials. Fuel increase is small in proportion to the increased production. Capital investment is particularly small, as nearly every cement plant employs a cooling device of some sort which can be readily converted into a heat treating container to practice the process by installing suitable burners. It is useful in that the possible modified cements which can be produced are almost unlimited. Potential compound composition is changed by additions; actual compound composition is changed by temperature control on the mixture. After completion of the process the clinker is cooled by any desired means and ground to cement fineness or stored and ground to cement fineness at a later time, with or without the addition of gypsum as may be desired to control set.

The amount of heat added to the mixture of any of the materials with the hot clinker, may be reduced if the additive is itself first heated, and this mode of adding some of the additional heat is within the purview of our invention.

Our invention, therefore, must not be confused with the mere additions of silicious, acidic and/or calcareous materials to hot clinker, but is drawn principally to the additional application of heat to the mixture, after the regular clinker has been formed and discharged from the kiln so as to maintain or raise the temperature of the mixture in a rotating drum and maintain it at the desired temperature for a time period running from a few minutes to several hours if necessary, until the required reaction has taken place and a new compound has been formed, and this we believe to be new in the art and we therefore claim:—

1. In the process of manufacturing cement, the steps which comprise adding to red-hot Portland cement clinker as discharged from the clinkering kiln, a material adapted to combine with said clinker at elevated sustained heat, and introducing additional heat to the mixture and maintaining it at an elevated temperature while tumbling it about until the desired combination has taken place.

2. In the process of manufacturing cement, the steps which comprise adding to red-hot Portland cement clinker as discharged from the clinkering kiln, a calcareous material adapted to combine with said clinker at elevated sustained heat, and introducing additional heat to the mixture and maintaining it at an elevated temperature while tumbling it about until the desired combination has taken place.

3. In the process of manufacturing cement, the steps which comprise adding to red-hot Portland cement clinker as discharged from the clinkering kiln, calcareous and silicious material adapted to combine with said clinker at elevated sustained heat, and introducing additional heat to the mixture and maintaining it at an elevated temperature while tumbling it about until the desired combination has taken place.

4. In the process of manufacturing cement, the steps which comprise adding to red-hot Portland cement clinker as discharged from the clinkering kiln a silicious material and introducing additional heat to the mixture while tumbling it about until said silicious material is activated, thereafter cooling the mixture.

5. In the process of manufacturing cement, the steps which comprise adding to red-hot Portland cement clinker as discharged from the clinkering kiln a silicious material and introducing additional heat to the mixture while tumbling it about until said material forms an adherent coating on the clinker, thereafter cooling the coated clinker.

6. In the process of manufacturing cement, the steps which comprise adding to red-hot Portland cement clinker as discharged from the clinkering kiln a silicious material together with a fluxing agent and introducing additional heat to the mixture while tumbling it about until said material forms an adherent coating on the clinker, thereafter cooling the coated clinker.

7. In the process of manufacturing cement, the steps which comprise adding to red-hot Portland cement clinker as discharged from the clinkering kiln silicious and calcareous material together with a fluxing agent and introducing additional heat to the mixture while tumbling it about until said material forms an adherent coating on the clinker, thereafter cooling the coated clinker.

8. In the process of manufacturing cement, the steps which comprise adding to red-hot Portland cement clinker as discharged from the clinkering kiln a material adapted to fuse thereto, and tumbling the mixture about until a coating is formed on the clinker substantially covering its outer surface.

9. A Portland cement clinker provided with a surface coating of extraneous material in adherent relation thereto substantially covering its outer surface.

10. A Portland cement clinker provided with a surface coating of extraneous material in vitrified adherent relation thereto substantially covering its outer surface.

11. A Portland cement clinker provided with a vitreous coating of silicious and argillaceous material covering the individual pieces of clinker and substantially sealing them against atmospheric effects.

12. A Portland cement clinker provided with a surface coating of pozzuolanic material in adherent relation thereto substantially covering its outer surface.

13. A Portland cement clinker provided with a surface coating of pozzuolanic material in adherent relation thereto substantially covering its outer surface, and in proportion to the clinker to form a high-silica cement when the coated clinker is ground to cement fineness.

14. In the process of manufacturing cement, the steps which comprise adding to red-hot Portland cement clinker as discharged from the clinkering kiln a clinker-modifying material, and sustaining the temperature of said clinker while tumbling the mixture about for a time period ranging from a few minutes to a couple of hours.

15. In the process of manufacturing cement, the steps which comprise adding to red-hot Portland cement clinker as discharged from the clinkering kiln a hot, clinker-modifying material, and sustaining the temperature of said clinker while tumbling the mixture about for a time period ranging from a few minutes to a couple of hours.

16. In the process of manufacturing cement, the steps which comprise adding to red-hot Portland cement clinker as discharged from the clinkering kiln a silicious material and tumbling the mixture about in a rotary drum until the desired action is effected.

HARRY M. LARMOUR.
STEPHEN C. PIERCE, Jr.